(12) United States Patent
Depner et al.

(10) Patent No.: US 6,204,628 B1
(45) Date of Patent: Mar. 20, 2001

(54) MOTOR START SWITCH

(75) Inventors: Eric A. Depner, Auburn; James A. Butcher, Fort Wayne, both of IN (US)

(73) Assignee: General Electric Company, New York, NY (US)

( * ) Notice: Subject to any disclaimer, the term of this patent is extended or adjusted under 35 U.S.C. 154(b) by 0 days.

(21) Appl. No.: 09/421,302

(22) Filed: Oct. 20, 1999

(51) Int. Cl.⁷ ........................................................ H02P 1/42
(52) U.S. Cl. ............................................. 318/788; 361/24
(58) Field of Search .................................. 318/751, 755, 318/774, 778, 783, 788, 798; 361/23, 24, 25, 26, 29

(56) References Cited

U.S. PATENT DOCUMENTS

| | | | |
|---|---|---|---|
| 4,384,312 | * 5/1983 | Fry | 361/24 |
| 4,473,789 | * 9/1984 | Hildebrandt et al. | 318/793 |
| 4,716,326 | * 12/1987 | Fisher | 310/89 |
| 5,564,831 | * 10/1996 | Bashark | 374/141 |

* cited by examiner

*Primary Examiner*—Robert E. Nappi
*Assistant Examiner*—Rina I. Duda
(74) *Attorney, Agent, or Firm*—Welsh & Katz, Ltd.; Eric D. Cohen; Jon P. Christensen

(57) ABSTRACT

A method and apparatus are provided for disconnecting a starting winding of a single-phase motor during startup. The method includes the steps of disposing a heater element of a thermal switch in series with a main winding of the single-phase motor and disposing a set of contacts of the thermal switch in series with the starting winding of the single-phase motor.

19 Claims, 1 Drawing Sheet

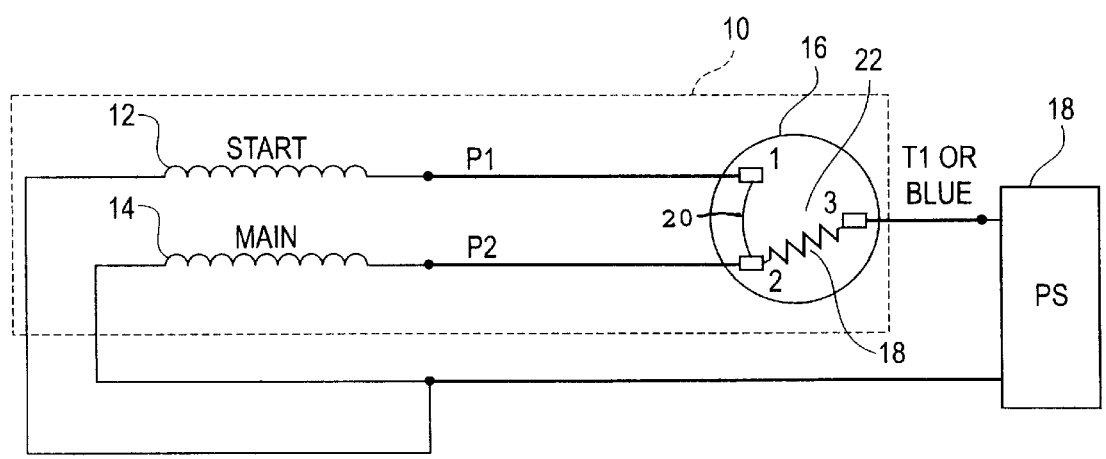

MOTOR START SWITCH

FIELD OF THE INVENTION

The field of the invention relates to electric motors and more particularly to signal-phase motors.

BACKGROUND OF THE INVENTION

Single-phase electric motors are typically equipped with a starting winding to improve starting torque and reduce a starting time. Once the motor reaches a running speed, the starting winding must be disconnected.

In the past mechanical devices have been used to disconnect the starting winding.

Typically a weight moved by centrifugal force is suspended from a lever which is, in turn, attached to a rotor of the motor. As the motor gains speed, the weight pressed against the lever forcing it outwards against a spring. As the motor reached full speed the force causes the lever to contact and activate a switch which disconnects the starting winding.

While the prior art mechanical devices have worked relatively well, they are prone to mechanical failure. They also require significant space due to the necessary mechanical movement. Because of the importance of single-phase motors, a need exists for a means for disconnecting starting windings that does not suffer from the deficiencies of the prior art.

SUMMARY

A method and apparatus are provided for disconnecting a starting winding of a single-phase motor during startup. The method includes the steps of disposing a heater element of a thermal switch in series with a main winding of the single-phase motor and disposing a set of contacts of the thermal switch in series with the starting winding of the single-phase motor.

BRIEF DESCRIPTION OF THE DRAWINGS

FIG. 1 depicts a single-phase motor under an illustrated embodiment of the invention.

DETAILED DESCRIPTION OF A PREFERRED EMBODIMENT

FIG. 1 is a block diagram of a single-phase electric motor 10, generally in accordance with an illustrated embodiment of the invention. Included within the motor 10 is a main winding 14 and a starting winding 12. The starting winding 12 and main winding 14 may be fabricated as is well known in the art.

Also included within the motor 10 is a thermal (starting) switch 16. The thermal switch 16 generally includes a thermal element 18 and switch 20.

The thermal switch 16 may be any thermally sensitive switch with a heater element and contacts designed to open when a motor has accelerated to its full load running speed. Under the illustrated embodiment, the thermal switch 16 may include a relatively low-resistance thermal element 18 coupled to a switch (e.g., a thermal relay) 20.

The thermal relay 20 may be any thermally sensitive device designed to occupy two stable electrically conductive states. In a first state (shown in FIG. 1), the thermal relay forms a conducting electrical path between terminals 1 and 2 of the thermal element 16. In a second state, the electrical path between terminals 1 and 2 is opened, thereby interrupting and preventing the flow of current between terminals 1 and 2. The thermal relay may occupy the first state when cool and the second state when warmed by the thermal element 18.

For example, the thermal relay 20 may include a bimetallic strip designed to occupy two stable positions (defined by two predetermined mechanical shapes) within the thermal switch 16, depending upon a temperature of the bimetallic element. As is known, a bimetallic element may be fabricated of two dissimilar metals with a different coefficient of expansion. When cool, the bimetallic element may occupy a first position and allow the thermal relay to form a contact across terminals 1 and 2 of the thermal switch 16. When warmed by heat from the thermal element 18, the bimetallic element may deflect to a second position, thereby opening the conductive path between terminals 1 and 2.

As a more specific example, a motor overload protector may be used as a thermal element 16. Motor overload protectors in the past have been used exclusively for protection of main windings (e.g., main winding 12 of FIG. 1). Under the illustrated embodiment, a motor overload protector has been found to have utility as a starting switch.

To more fully illustrate the embodiment, a single phase motor (e.g., a GE model #5KH37EN3822X, 11.7 FLA, 115V, ½ hp, 2 pole, 3450 rpm, class B motor) was selected. A motor overload protector (e.g., a KLIXON®, model #MET36AKO) was used as a thermal starting switch 16 in series with the starting winding as shown in FIG. 1. A 115 volt power supply 18 was coupled to the motor assembly 10, also as shown in FIG. 1. The selected motor with overload protector used as a thermal switch 16 for testing was found to perform reliably.

The switch 16 has been found to be useful in any application where a motor is lightly loaded at startup and is not required to cycle on and off. These conditions typically exist in the case of water pumps or fans for moving air.

Under the illustrated embodiment, during startup current from both the main winding and starting winding are directed through the heater element 18. The starting current of the main and starting windings 12, 14 passing through the heater element 18 functions to open the contacts 1, 2 of the thermal relay 20 after a few seconds, thus removing the starting winding 12 from the motor circuit.

The mechanical structure 22 of the thermal switch 16 (e.g., the housing, switch elements, heater, etc.) provide thermal inertia to the switch 16. The thermal inertia of the structure 22 is selected to emulate the mechanical inertia of the motor 10 on startup and to delay opening of the switch until the motor 10 has reached full speed.

When the contacts open, only the current in the main winding 14 continues to pass through the heater element 18, thereby supplying sufficient heat to keep the thermally responsive contacts of the thermal relay 20 in the open position, until the motor 10 is turned off. When the motor 10 is turned off, the heater 18 stops producing heat due to lack of current and the contacts of the thermal relay 20 reset, thereby returning to the closed position. When the contacts close, the motor is ready to start the next time power is supplied from the power source 18.

Under the illustrated embodiment, the thermal switch 16 may be located within the motor 10 as shown in FIG. 1 or elsewhere. Locating the thermal switch 16 elsewhere may provide the additional advantage of isolating the thermal switch 16 from the environment of the motor 10.

The thermal switch 16 replaces prior art mechanical devices. When located within the motor housing, it functions to reduce a motor shell length and rotor shaft length. The reduction in shell and shaft length operates to reduce motor size and material costs.

In an alternate embodiment, the thermal relay 20 may be provided by a temperature sensor (e.g., a thermocouple) coupled to a thermal delay element (e.g., a mass of plastic or metal delaying a rate of temperature rise caused by the thermal element 18. The temperature sensor may, in turn, be coupled to a thermal switch, which occupies the first and second states depending upon the temperature of the thermal delay element.

A specific embodiment of a method and apparatus for motor start switch according to the present invention has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

What is claimed is:

1. A method of disconnecting a starting winding of a single-phase motor during startup, such method comprising the steps of:
   disposing a heater element of a thermal switch in series with a main winding of the single-phase motor;
   disposing a set of contacts of the thermal switch in series with the starting winding of the single-phase motor; and
   opening the set of contacts in series with the starting winding when the motor has accelerated to a full load running speed thereby allowing the motor to continue to run without current flow through the starting winding.

2. The method of disconnecting a starting winding as in claim 1 further comprising routing a current of the starting winding through the heater element.

3. The method of disconnecting a starting winding as in claim 2 further comprising opening the contacts of the thermal switch in response to a temperature rise caused by the heater element.

4. The method of disconnecting a starting winding as in claim 3 further comprising connecting a single-phase power source across the main winding and across the series connected starting winding and thermal switch.

5. The method of disconnecting a starting winding as in claim further comprising providing a delay between application of the single phase power source to the main winding and opening the set of contacts of the thermal switch.

6. The method of disconnecting a starting winding as in claim 5 wherein the step of providing the delay between application of the single phase current to the main winding and opening the set of contacts of the thermal switch further comprises providing a thermal mass between the heater element and a temperature sensor of the set of contacts.

7. The method of disconnecting a starting winding as in claim 6 wherein the step of opening the contacts furcomprises detecting a temperature of the thermal mass.

8. The method of disconnecting a starting winding as in claim 5 wherein the step of opening the contacts further comprises coupling heat from the thermal element to a bimetallic element of the set of contacts.

9. Apparatus for disconnecting a starting winding of a single-phase motor during startup, such apparatus comprising:
   means for generating heat disposed in series with a main winding of the single-phase motor; and
   means coupled to the means for generating heat for interrupting current in the starting winding of the single-phase motor when the motor has accelerated to a full load running speed thereby allowing the motor to continue to run without current flow through the starting winding.

10. The apparatus for disconnecting a starting winding as in claim 9 further comprising means for routing a current of the starting winding through the means for generating heat.

11. The apparatus for disconnecting a starting winding as in claim 9 further comprising means for activating the means for interrupting.

12. The apparatus for disconnecting a starting winding as in claim 11 further comprising means for providing a delay between connection of a single phase power supply to the main winding and activation of the means for interrupting.

13. The apparatus for disconnecting a starting winding as in claim 12 wherein the means for providing the delay between application of the single phase power supply to the main winding and activation of the means for interrupting further comprises means for providing a thermal inertia between the means for generating heat and the means for interrupting.

14. The apparatus for disconnecting a starting winding as in claim 12 wherein the means for interrupting current further comprises means for coupling heat from the means for generating heat means for interrupting.

15. The method of disconnecting a starting winding as in claim 14 wherein the mean for coupling further comprises means for delaying a rate of temperature rise in the means for interrupting.

16. Apparatus for disconnecting a starting winding of a single-phase motor during startup, such apparatus comprising:
   a heater element adapted to generate heat disposing in series with a main winding of the single-phase motor; and
   a thermally activated switch coupled to the thermal element and adapted to interrupt current within the starting winding of the single-phase motor when the motor has accelerated to a full load running speed thereby allowing the motor to continue to run without current flow through the starting winding.

17. The apparatus for disconnecting a starting winding as in claim 16 further comprising a thermal delay adapted to provide a delay between application of a single phase power supply to the main winding and opening a set of contacts of the thermal switch.

18. The apparatus for disconnecting a starting winding as in claim 17 wherein the thermal delay further comprises a thermal inertia disposed between the heater element and the thermally activated switch.

19. A single-phase motor comprising:
   a main winding;
   a starting winding; and
   a thermal switch with a heater element of the thermal switch disposed in series with the main winding and a set of thermally activated contacts of the thermal switch disposed in series with the starting winding.

* * * * *